United States Patent
Gibson et al.

(10) Patent No.: US 9,969,383 B2
(45) Date of Patent: May 15, 2018

(54) METHODS AND SYSTEM FOR STARTING AN ENGINE OF A HYBRID VEHICLE

(71) Applicant: Ford Global Technologies, LLC, Dearborn, MI (US)

(72) Inventors: Alexander O'Connor Gibson, Ann Arbor, MI (US); Felix Nedorezov, Rochester Hills, MI (US); Seunghoon Lee, Northville, MI (US); Jeffrey Allen Doering, Canton, MI (US); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/658,983

(22) Filed: Jul. 25, 2017

(65) Prior Publication Data
US 2017/0320486 A1    Nov. 9, 2017

Related U.S. Application Data

(62) Division of application No. 14/449,759, filed on Aug. 1, 2014, now Pat. No. 9,731,710.

(51) Int. Cl.
| | |
|---|---|
| *B60W 10/06* | (2006.01) |
| *B60W 20/40* | (2016.01) |
| *B60W 20/13* | (2016.01) |
| *B60W 10/02* | (2006.01) |
| *F02N 11/08* | (2006.01) |
| *B60W 10/08* | (2006.01) |
| *B60W 30/20* | (2006.01) |
| *F02N 11/04* | (2006.01) |

(52) U.S. Cl.
CPC ............ *B60W 20/40* (2013.01); *B60W 10/02* (2013.01); *B60W 10/06* (2013.01); *B60W 10/08* (2013.01); *B60W 20/13* (2016.01); *B60W 30/20* (2013.01); *F02N 11/0825* (2013.01); *B60W 2030/206* (2013.01); *F02N 11/04* (2013.01); *F02N 11/0837* (2013.01); *F02N 2200/042* (2013.01); *F02N 2200/0801* (2013.01); *F02N 2200/0808* (2013.01); *F02N 2200/124* (2013.01); *F02N 2300/104* (2013.01); *Y02T 10/48* (2013.01); *Y10S 903/93* (2013.01)

(58) Field of Classification Search
CPC .... B60W 20/40; B60W 10/06; F02N 11/0825
See application file for complete search history.

(56) References Cited

U.S. PATENT DOCUMENTS

| | | | |
|---|---|---|---|
| 8,545,367 B2 | 10/2013 | Hartz et al. | |
| 2007/0221256 A1 | 9/2007 | Chen et al. | |
| 2012/0046844 A1 | 2/2012 | Okada et al. | |
| 2012/0277982 A1 | 11/2012 | Weaver | |
| 2013/0297136 A1* | 11/2013 | Yamanaka | B60K 6/48 701/22 |
| 2015/0344019 A1* | 12/2015 | Matsui | B60K 6/48 701/22 |
| 2017/0183011 A1* | 6/2017 | Theel | B60W 30/18072 |

* cited by examiner

*Primary Examiner* — Derek D Knight
(74) *Attorney, Agent, or Firm* — David Kelley; McCoy Russell LLP (57) ABSTRACT

Systems and methods for starting an engine of a hybrid vehicle are disclosed. The systems and methods disclosed may apply to series or parallel hybrid driveline configurations. In one example, engine cranking torque may be adjusted in response to a variety of operating conditions so that the engine may be started faster or slower.

4 Claims, 4 Drawing Sheets

FIG. 4 ns engine of a hybrid vehicle

CROSS REFERENCE TO RELATED APPLICATION

The present application is a divisional of U.S. patent application Ser. No. 14/449,759, entitled "METHODS AND SYSTEM FOR STARTING AN ENGINE OF A HYBRID VEHICLE," filed on Aug. 1, 2014. The entire contents of the above-referenced application are hereby incorporated by reference in its entirety for all purposes.

FIELD

The present description relates to a system and methods for starting an engine of a hybrid vehicle. The system and methods may be particularly useful for hybrid vehicles that include an electric motor and an engine.

BACKGROUND AND SUMMARY

An engine of a hybrid vehicle may be started to meet driver demand torque, recharge an electric energy storage device, to warm a passenger cabin, or for other reasons. The engine may be started via an electric machine that supplies torque to the hybrid vehicle's driveline to propel the vehicle. However, engine starting may be noticeable and objectionable to a driver if it results in a driveline torque disturbance. Further, the driver may find engine starting objectionable if the driver recognizes that driver demand torque is not being met while the engine is being started. For these reasons, it may be desirable to provide a way of starting an engine that reduces the possibility of a driver noticing a driveline torque disturbance and reduced driver demand torque response.

The inventors herein have recognized the above-mentioned disadvantages and have developed a driveline method, comprising: estimating a driveline integrated starter/generator torque reserve; supplying a first torque to start an engine in response to the driveline integrated starter/generator torque reserve being less than a threshold; and supplying a second torque, different from the first torque, to start the engine in response to the driveline integrated starter/generator torque reserve being greater than a threshold.

By supplying different torques to start an engine in response to a driveline integrated starter/generator (DISG) torque reserve, it may be possible to provide the technical result of reducing driveline torque disturbances and improving a torque response to a driver demand torque. For example, if vehicle conditions indicate that DISG torque reserve is low, increased DISG torque may be transferred to the engine so that the engine may be started sooner to improve driveline torque response and to assist in meeting driver demand torque. On the other hand, if the DISG torque reserve is high, less DISG torque may be transferred to the engine so that additional DISG torque may be available to meet vehicle operating conditions, thereby reducing driveline torque disturbances.

The present description may provide several advantages. For example, the approach may reduce driveline torque disturbances. Additionally, the approach may provide improve a driveline's response to driver demand torque. Further, the approach may be applied to improve starting of gasoline and diesel engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
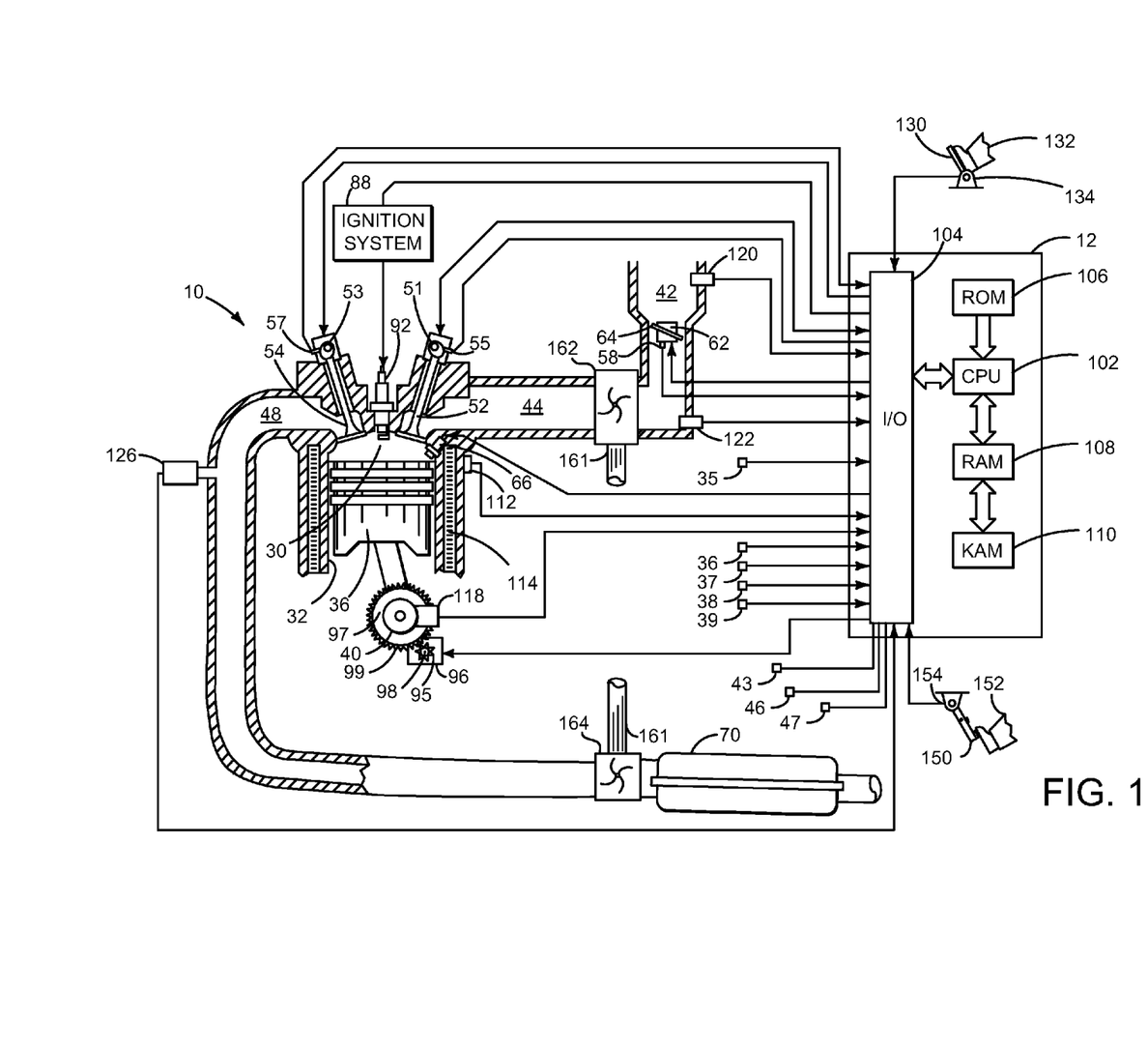
FIG. 1 is a schematic diagram of an engine.
Figure 2:
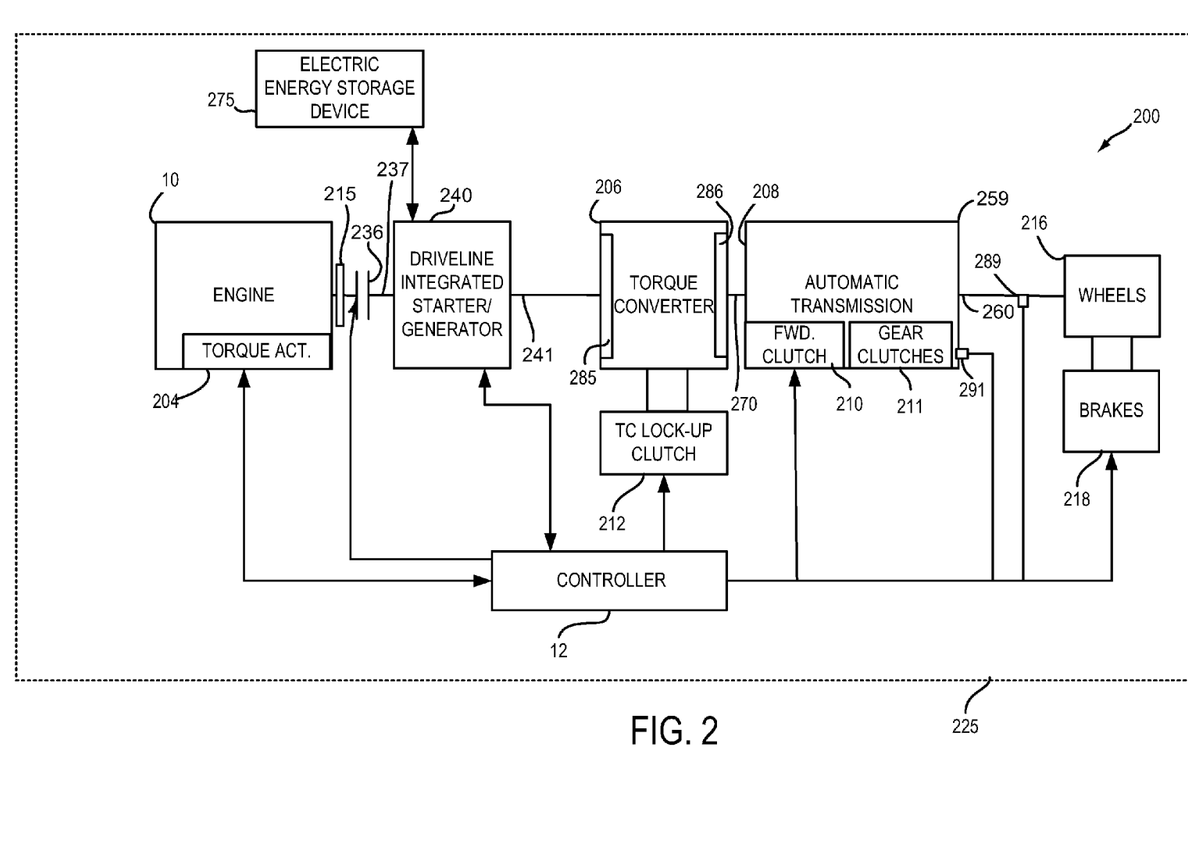
FIG. 2 shows an example vehicle driveline configuration.
Figure 3:
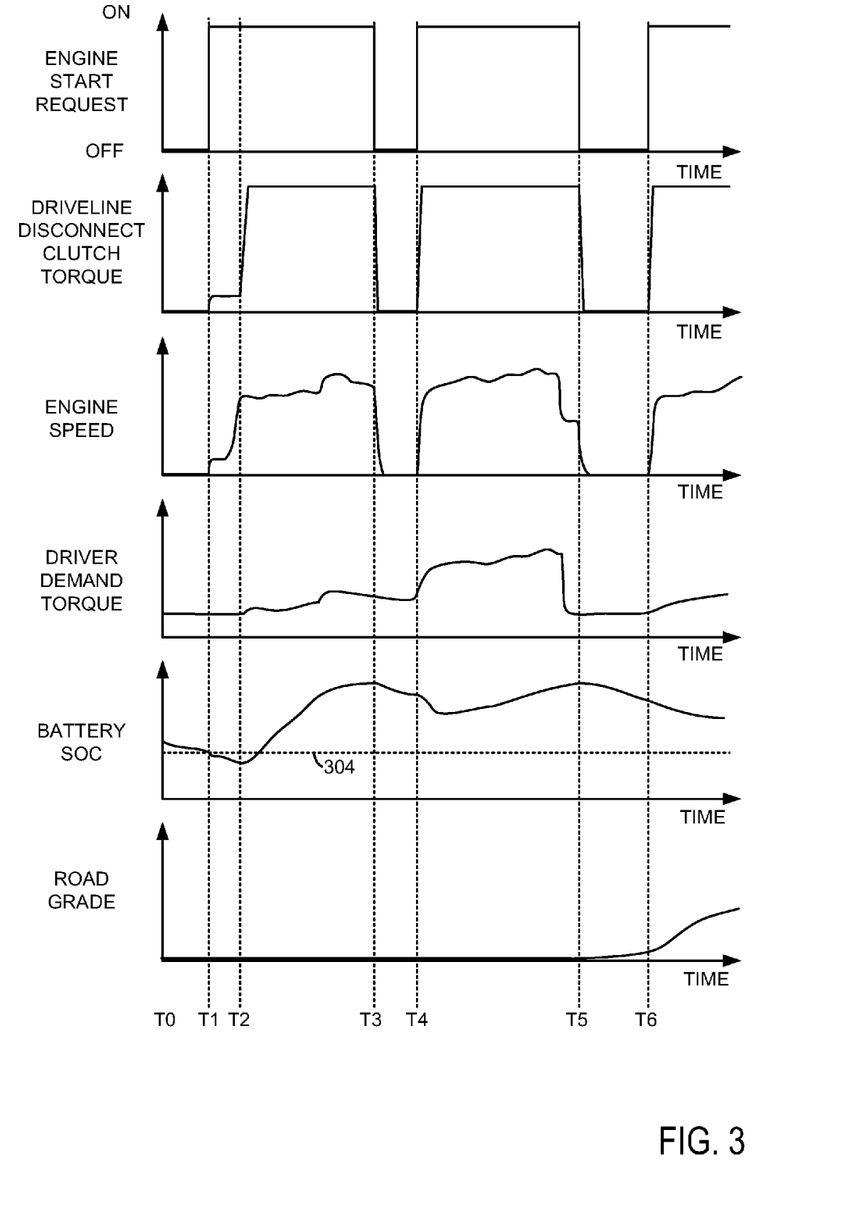
FIG. 3 shows an example engine starting sequences.

The present description is related to improving starting an engine of a hybrid vehicle. The engine may be a gasoline engine as shown in FIG. 1. Alternatively, the engine may be a diesel or gaseous fueled (e.g., natural gas) engine. The engine may be incorporated into a hybrid driveline as is shown in FIG. 2. The engine in the system of FIGS. 1 and 2 may be started as is shown in the sequence of FIG. 3. The engine may be started according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; a measure of road grade from inclinometer 35; a measure of vehicle acceleration from accelerometer 36; an indication of trailer tow from trailer receptacle 37; a measure of road roughness from suspension height sensor 38; an indication of four wheel drive engagement from sensor 39; an indication of an intersection from camera or GPS sensor 46; an indication of driver selected fast start from sensor 47; an indication of steering angle from sensor 43; and a measurement of throttle position from sensor 58.

Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30.

The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted.

The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission 208 also includes a transmission temperature sensor 291 for determining transmission oil temperature.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure. Vehicle speed may be determined via speed sensor 289.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; an electric machine; a driveline disconnect clutch positioned between the engine and the electric machine; and a controller including executable instructions stored in non-transitory memory for starting the engine via the electric machine in a first mode where engine cranking torque is sufficient to accelerate the engine to a speed of the electric machine, starting the engine in a second mode where engine cranking torque is insufficient to accelerate the engine to the speed of the electric machine, and adjusting slip of the driveline disconnect clutch to provide engine cranking torque in the first and second modes.

The driveline system further comprises additional instructions to estimate a driveline integrated starter/generator torque reserve and enter the first or second mode based on the driveline integrated starter/generator torque reserve. The driveline system further comprises additional instructions to enter the first or second mode based on a condition of a road. The driveline system also includes where the condition of the road is a road grade.

Referring now to FIG. 3, example hybrid vehicle engine starting sequences are shown. The sequence of FIG. 3 may be provided by the system of FIGS. 1 and 2 executing the method of FIG. 4.

The first plot from the top of FIG. 3 is a plot engine start request versus time. The engine start request may be initiated by a driver or a controller. The driver may initiate an engine start via operating a key or pushbutton switch. A controller may automatically initiate an engine start in response to vehicle operating conditions. The Y axis represents a state of the engine start request. The engine start request is asserted when the engine start trace is at a higher level near the Y axis arrow. The engine start request remains asserted while the engine operates. The X axis represents time and time increases from the left side of FIG. 3 to the right side of FIG. 3.

The second plot from the top of FIG. 3 is a plot of driveline disconnect clutch torque transmitting capacity versus time. The Y axis represents driveline disconnect clutch torque transmitting capacity and the torque transmitting capacity increases in the direction of the Y axis arrow. The driveline disconnect clutch torque transmitting capacity is an amount of torque the driveline disconnect clutch may transfer from one device to another device (e.g., from the DISG to the engine). The X axis represents time and time increases from the left side of FIG. 3 to the right side of FIG. 3.

The third plot from the top of FIG. 3 is a plot of engine speed versus time. The Y axis represents engine speed and engine speed increases in the direction of the Y axis arrow. The X axis represents time and time increases from the left side of FIG. 3 to the right side of FIG. 3.

The fourth plot from the top of FIG. 3 is a plot of driver demand torque versus time. The Y axis represents driver demand torque and driver demand torque increases in the direction of the Y axis arrow. In one example, driver demand torque is determined from vehicle speed and accelerator pedal position. The X axis represents time and time increases from the left side of FIG. 3 to the right side of FIG. 3.

The fifth plot from the top of FIG. 3 is a plot of battery state of charge (SOC) versus time. Battery SOC may be estimated from battery voltage or via coulomb counting. Battery SOC increases in the direction of the Y axis arrow. The X axis represents time and time increases from the left side of FIG. 3 to the right side of FIG. 3. Horizontal line 304 indicates a low battery SOC threshold. When battery SOC is less than threshold 304, the battery is at a low SOC. When the battery SOC is greater than threshold 304, the battery is not at a low SOC.

The sixth plot from the top of FIG. 3 is a plot of road grade versus time. Road grade may be estimated from an instrument such as an inclinometer or an accelerometer. In some examples, road grade may be expressed as an angle. Road grade increases in the direction of the Y axis arrow. Road grade above the X axis is positive (e.g., uphill) and road grade below the X axis is negative (e.g., downhill). The X axis represents time and time increases from the left side of FIG. 3 to the right side of FIG. 3.

At time T0, the engine start request is not asserted and engine speed is zero indicating that the engine is stopped and at rest. The driveline disconnect clutch torque is zero indicating that the driveline disconnect clutch is in an open state. The driver demand torque is low and the battery SOC is declining. The DISG (not shown) may propel the vehicle during such conditions. The road grade is zero.

At time T1, the battery SOC is reduced to less than threshold level 304. Therefore, an engine start request is issued in response to the low SOC as is indicated by the engine start request transitioning to a higher level. The driveline disconnect clutch is partially closed to provide a small amount of engine cranking torque from the DISG (not shown) to the engine. The engine is cranked with the low torque and the engine is not cranked with sufficient torque to accelerate the engine to DISG speed (not shown). The driver demand torque remains at a lower level and the road grade remains at a lower level. The low road grade and low driver demand torque provide an indication that the DISG may have sufficient torque capacity to meet vehicle operating conditions so that there is no need to accelerate the engine quickly to DISG speed. Rather, the engine may be started using a small amount of DISG torque so that the DISG may simultaneously meet vehicle torque requirements and engine starting torque. The battery SOC continues to decline as the DISG consumes charge to propel the vehicle and start the engine. The road grade remains zero.

At time T2, the engine has started and it accelerated under its own power to the DISG speed (not shown) where the driveline disconnect clutch torque capacity is increased to fully close the driveline disconnect clutch. The engine start request remains asserted and the driver demand torque begins to increase. The battery SOC also begins to increase after the driveline disconnect clutch is closed. The road grade remains zero.

Between time T2 and time T3, the battery SOC is increased as engine torque is converted to electrical energy. Engine speed is varied in response to a varying driver demand torque. The engine start request remains asserted and the driveline disconnect clutch torque capacity remains at a high level where the driveline disconnect clutch is fully closed. The road grade remains at zero.

At time T3, the engine start request transitions to a lower level in response to battery SOC at a high level and driver demand torque being at a lower middle level. The engine speed is reduced to zero as engine rotation stops and the engine comes to rest. The engine is stopped by ceasing to supply the engine spark and fuel. The driveline disconnect clutch also opens so that the DISG does not have to rotate the engine while the engine is not combusting air-fuel mixtures. The road grade remains at zero.

At time T4, the driver increases the driver demand torque and the engine start request is asserted in response to the increase in driver demand torque. The driveline disconnect clutch torque capacity is increased quickly to accelerate the engine to the DISG speed. The engine is accelerated to DISG speed via transferring DISG torque to the engine. Spark and fuel are supplied to the engine as it accelerates up to the DISG speed. Accelerating the engine to DISG speed via the DISG and driveline disconnect clutch may allow the engine to reach conditions where engine torque may be delivered to the driveline sooner as compared to if the engine accelerated itself to DISG speed. The battery SOC begins to increase as the engine starts to supply torque to the driveline. The road grade remains at zero.

Between time T4 and time T5, the battery SOC is increased as engine torque is converted to electrical energy. Engine speed is varied in response to a varying driver demand torque. The engine start request remains asserted and the driveline disconnect clutch torque capacity remains at a high level where the driveline disconnect clutch is fully closed. The road grade remains at zero.

At time T5, the engine start request transitions to a lower level in response to battery SOC at a high level and driver demand torque being at a lower level. The engine speed is reduced to zero as engine rotation stops and the engine comes to rest. The engine is stopped by ceasing to supply the engine spark and fuel. The driveline disconnect clutch also opens so that the DISG does not have to rotate the engine while the engine is not combusting air-fuel mixtures. The road grade remains at zero.

At time T6, the vehicle has continued to travel to a destination where road grade has increased via the DISG. An increasing road grade may be interpreted as a condition that may lead to engine starting to meet driver demand torque. Therefore, road grade may be the basis for restarting the engine before a driver demand torque exceeds a threshold level so that engine torque is available when driver demand torque increases to a level where the DISG lacks capacity to provide the driver demand torque. In this way, road grade may be criteria for anticipating when engine starting is going to be needed.

The engine start request is asserted in response to the increase in road grade. Further, because road grade may be indicative of a reduction in battery SOC and further increases in driver demand torque for which the DISG may lack torque capacity, a fast or quick engine start where the engine is immediately accelerated to DISG speed is performed. The engine is accelerated to DISG speed via increasing driveline disconnect clutch torque and closing the driveline disconnect clutch.

The quick engine start at time T6 may be contrast with the slower engine start shown at time T2 where DISG torque is provided via the driveline disconnect clutch to the engine to achieve a cranking speed but not the DISG speed. The quick engine start may allow the engine to supply torque to the driveline sooner than if the engine accelerated itself to the DISG speed.

In this way, engine starting torque may be adjusted differently for different engine starts. A lower torque may be supplied to crank the engine via slipping the driveline disconnect during conditions when the DISG is expected to be able to provide requested torque for a longer period of time. A higher torque may be supplied to accelerate the engine up to DISG speed when the DISG is not expected to be able to provide requested torque for the longer period of time.

Figure 4:
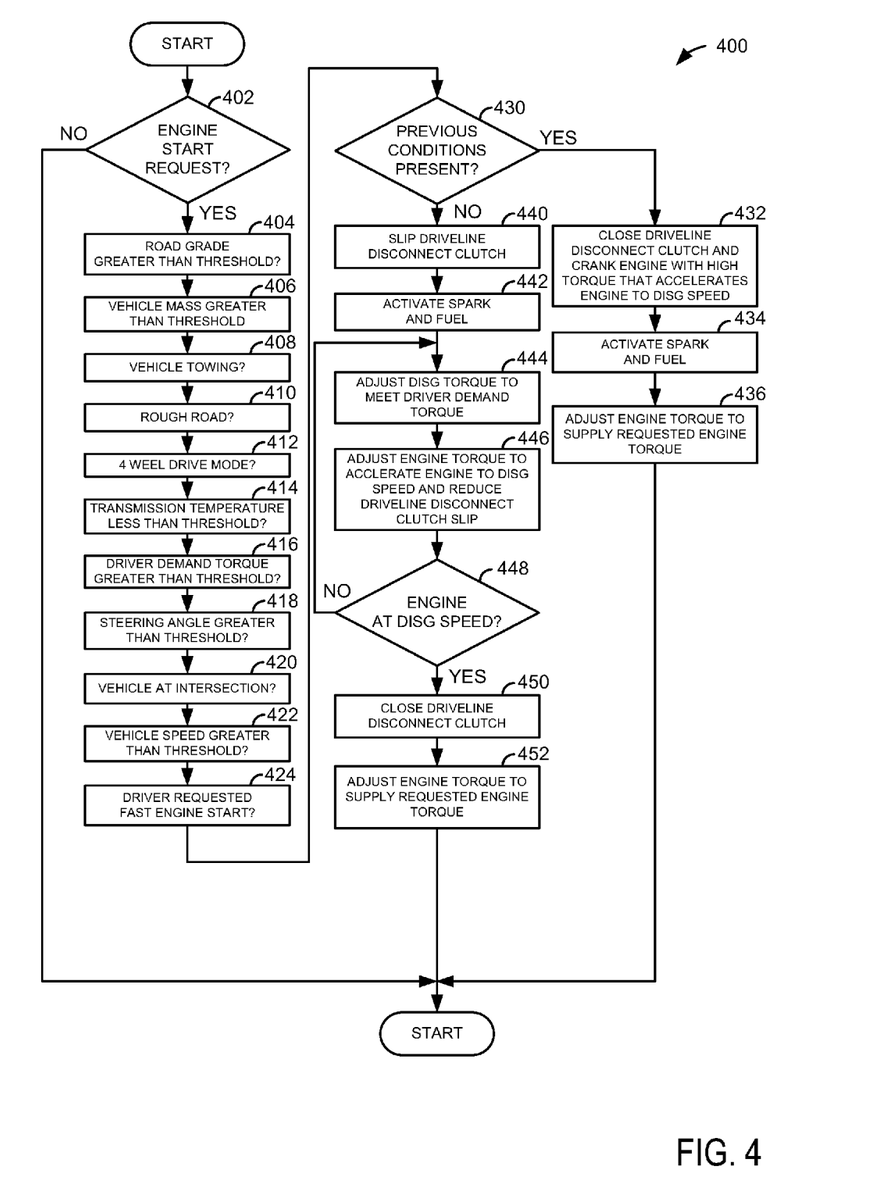
FIG. 4 shows an example method for starting an engine of a hybrid vehicle.

Referring now to FIG. 4, a method for starting an engine of a hybrid vehicle is shown. The method of FIG. 4 may provide the operating sequence shown in FIG. 3. Additionally, the method of FIG. 4 may be included in the system of FIGS. 1 and 2 as executable instructions stored in non-transitory memory.

At 402, method 400 judges if there is an engine start request. An engine start request may be generated via a driver operating a key or pushbutton switch, a key fob being within a proximity of a vehicle cabin, a controller changing a state of a bit or output, or via other known ways of requesting an engine start request. If method 400 judges that an engine start request is present, the answer is yes and method 400 proceeds to 404. Otherwise, the answer is no and method 400 proceeds to exit.

At 404, method 400 determines road grade and if road grade is greater than a threshold road grade. A positive road grade may be a basis for an indication that engine torque will be needed soon. A negative road grade may be an indication that engine torque will not be needed soon. Road grade may be determined via an inclinometer 35 or inferred. Road grade may be determined via solving the following equation for road grade:

$$T_{w1} = R_{rr} \cdot M_v \cdot g \cdot \sin(\theta_1) + T_{rl}$$

Where $T_{w1}$ is wheel torque which may be estimated based on transmission gear ratio, engine torque, and torque converter torque multiplication ratio; $R_{rr}$ is the vehicle's wheel rolling radius; $M_v$ is vehicle mass; g is the gravitational constant; $\theta_1$ is road grade angle; and $T_{rl}$ is road load torque. $T_{rl}$ may be empirically determined from coast down data, $R_{rr}$ may be stored in memory; and vehicle mass may likewise be stored in memory and adjusted based on operating conditions such as vehicle ride height.

Road grade is determined and stored to memory. Further, road grade is compared to a threshold road grade and a variable is set to a value of one if road grade is positive and greater than the threshold positive road grade. Additionally, if road grade is negative, road grade may be compared to a negative road grade. A variable is set to a value of one if road grade is negative and less than the threshold negative road grade, otherwise the variable is a value of zero. Method 400 proceeds to 406 after road grade is determined.

At 406, method 400 determines vehicle mass. Vehicle mass may be estimated by solving the equation at 404 for $M_v$. Alternatively, vehicle mass may be estimated based on output of an accelerometer. The estimated vehicle mass is stored to memory and compared to a threshold vehicle mass. If the estimated vehicle mass is greater than the threshold vehicle mass, a variable is set to a value of one. Vehicle mass like road grade may be indicative that the engine may have to be started soon because a larger vehicle mass requires a higher torque to maintain a same rate of acceleration as a lower vehicle mass. Therefore, it may be inferred that the engine will have to be started sooner than if the base vehicle mass were present because additional torque may be needed to accelerate the vehicle. Method 400 proceeds to 408 after the vehicle's mass is determined and stored to memory. Further, a variable is set to a value of one if vehicle mass is greater than a threshold vehicle mass, otherwise the variable is a value of zero.

At 408, method 400 determines if the vehicle is towing a trailer. The vehicle may be determined to be towing a trailer if a plug is detected at a trailer receptacle. The plug may be detected based on a sensed voltage or a change in impedance. An indication of trailer towing may also be indicative that an engine start will be requested sooner than if a trailer were not present during similar driving conditions. The trailer tow indication like a vehicle mass increase may be indicative that the engine may have to be started soon because towing a trailer increases vehicle mass and a larger vehicle mass requires a higher torque to maintain a same rate of acceleration as a lower vehicle mass. Therefore, it may be inferred that the engine will have to be started sooner than if the trailer were not present because additional torque may be needed to accelerate the vehicle. Method 400 proceeds to 408 after the vehicle's mass is determined. Further, a variable is set to a value of one if trailer towing is determined, otherwise the variable is a value of zero.

At 410, method 400 determines if a rough road is present. The vehicle may be determined to be operating on a rough road if a vehicle suspension sensor detects a change in vehicle height greater than a threshold. An indication rough road may also be indicative that an engine start will be requested sooner than if the vehicle were not traveling on a rough road during similar driving conditions. The rough road indication may be indicative that the engine may have to be started soon because the vehicle may have to be decelerated and accelerated more frequently because of road conditions. Frequent accelerations may consume battery charge at a higher rate than operating the vehicle at a constant speed. Therefore, it may be inferred that the engine will have to be started sooner than if the rough road were not present because additional torque may be needed to accelerate the vehicle more frequently. Method 400 proceeds to 412 after rough road conditions are determined. Additionally, a variable is set to a value of one if a rough road is determined, otherwise the variable is a value of zero.

At 412, method 400 determines if the vehicle is in four wheel drive. The vehicle may be determined to be operating in four wheel drive if a vehicle drive mode sensor detects engagement of 4×4 mode. Operating the vehicle in four wheel drive may also be indicative that an engine start will be requested sooner than if the vehicle were not operating in four wheel drive during similar driving conditions. The four wheel drive mode road indication may be indicative that the engine may have to be started soon because the vehicle's driveline may operate less efficiently when four wheel drive is engaged. Therefore, it may be inferred that the engine will have to be started sooner than if the vehicle were not in four wheel drive because additional torque may be needed to accelerate the vehicle. Method 400 proceeds to 414 after four wheel drive mode is determined. Additionally, a variable is set to a value of one if four wheel drive mode is determined to be engaged, otherwise the variable is a value of zero.

At 414, method 400 determines if transmission temperature (e.g., transmission oil temperature) is less than a threshold temperature. A transmission temperature less than the threshold temperature may be indicative of increased driveline friction that may be expected to result in an engine start request sooner than if the transmission temperature where at a higher level. Method 400 proceeds to 416 after transmission temperature is determined. Additionally, a variable is set to a value of one if transmission temperature is less than the threshold temperature, otherwise the variable is a value of zero.

At 416, method 400 determines if driver demand torque is greater than a threshold torque. The threshold torque may be reduced if road grade is greater than a threshold, 4×4 mode is active, towing is active, vehicle mass is greater than a threshold, rough road conditions are present, and transmission temperature is less than a threshold. Method 400 proceeds to 418 after it is determined if driver demand torque is greater than a threshold. Additionally, a variable is set to a value of one if driver demand torque is greater than the threshold torque, otherwise the variable is a value of zero.

At 418, method 400 determines if steering angle is greater than a threshold. Steering angle greater than the threshold may be indicative of the vehicle merging into a traffic stream (e.g., a highway) where it may be expected that an engine start request will occur sooner than if the steering angle where less than the threshold level. Method 400 proceeds to 420 after steering angle is determined. Additionally, a variable is set to a value of one if steering angle is greater than the threshold angle, otherwise the variable is a value of zero.

At 420, method 400 determines if the vehicle is at an intersection. The intersection may be an intersection of another road or a rail road. The presence of an intersection may be determined via a GPS or a camera on the vehicle. Presence of an intersection may be indicative of a desire for higher levels of driver demand torque to proceed from the intersection. Further, it may be desirable to have full driveline torque available at intersections so that a driver may not experience any torque delay related to engine restarting. Availability of full driveline torque may be desirable to avoid interactions with other traffic passing through the intersection. Therefore, it may be desirable to restart the engine as the vehicle approaches an intersection even in the absence of high driver demand torque. Method 400 proceeds to 422 after determining if the vehicle is approaching an intersection. Additionally, a variable is set to a value of one if the vehicle is approaching or within an intersection, otherwise the variable is a value of zero.

At 422, method 400 determines if vehicle speed is greater than a threshold speed. Vehicle speed may be indicative of imminent engine starting because DISG torque is reduced at higher driveline speeds. Consequently, the engine may have to be started to achieve yet higher vehicle speeds. Further, as vehicle speed increases, aerodynamic losses may increase exponentially so that even higher driveline torque levels may be needed to achieve higher vehicle speeds. For at least these reasons, vehicle speed may be an indicator for a subsequent desired for additional driveline torque and engine starting. Method 400 proceeds to 424 after vehicle speed is determined. Additionally, a variable is set to a value of one if vehicle speed is greater than the threshold speed, otherwise the variable is a value of zero.

At 424, method 400 determines if a driver wishes for all engine starts to be fast engine starts where the engine is accelerated to DISG speed with torque transferred from the DISG to the engine via the driveline disconnect clutch. The driver may request that all engine starts are fast engine starts via an operator interface such as a pushbutton or display panel. Method 400 proceeds to 430 after determining if the driver is requesting all engine starts to be fast engine starts. Additionally, a variable is set to a value of one if it is determined that the driver wishes for all engine starts to be fast engine starts, otherwise the variable is a value of zero.

At 430, method 400 judges if any of the conditions at 404-424 are present. If so, the answer is yes and method 400 proceeds to 432. Otherwise, method 400 proceeds to 440.

Alternatively or in addition, method 400 may adjust a DISG torque reserve amount based on detection of conditions at 404-424. In one example, DISG torque reserve is the DISG's torque capacity (e.g., maximum DISG output torque) at the present DISG speed minus the DISG torque output at the present DISG speed. The torque reserve may be lowered based on the conditions determined at 404-424. For example, if the DISG torque reserve is determined to be 100 NM based on the DISG's torque capacity minus the present DISG torque output, the DISG torque reserve may be reduced to 70 NM if road grade greater than a threshold is determined at 404. The DISG torque reserve may then be compared to a threshold DISG torque reserve. If the adjusted DISG torque reserve is less than or equal to the threshold DISG torque reserve, the answer at 430 is yes and method 400 proceeds to 432. Otherwise, the answer is no and method 400 proceeds to 440. Similar adjustments to the DISG torque reserve are provided for the conditions determined at 404-424.

At 432, method 400 closes the driveline disconnect clutch and torque sufficient to accelerate the engine to DISG speed is transferred by the driveline disconnect clutch the engine to fast start the engine. This may be regarded as a higher cranking torque. Further, DISG torque output may be increased to maintain DISG speed as torque is transferred from the DISG to the engine via the driveline disconnect clutch. Engine torque may or may not be adjusted to assist the engine running up to DISG speed. Method 400 proceeds to 434 as the driveline disconnect clutch begins to close and the engine is accelerated to DISG speed.

At 434, method 400 supplies fuel and spark to the accelerating engine. Spark and fuel are supplied based on engine position and engine combustion order. Method 400 proceeds to 436 after engine spark and fuel have been activated.

At 436, method 400 adjusts engine torque via a torque actuator to meet the engine demand torque. The engine demand torque may be based on the driver demand torque. In one example, the driver demand torque may be partially or fully demanded of the engine. Further, the driver demand torque may be partially demanded of the DISG. Method 400 proceeds to exit after the driver demand torque is requested via the engine and/or the DISG.

At 440, method 400 slips the driveline disconnect clutch to provide torque from the DISG to the engine that is sufficient to rotate the engine at cranking speed to overcome compression torque but insufficient to accelerate the engine to DISG speed. For example, the engine may be cranked at a speed that a low voltage starter cranks the engine (e.g., 250 RPM). Method 400 proceeds to 442 after the engine begins to accelerate to cranking speed.

At 442, method 400 supplies fuel and spark to the accelerating engine. Spark and fuel are supplied based on engine position and engine combustion order. Method 400 proceeds to 444 after engine spark and fuel have been activated.

At 444, method 400 adjusts DISG torque to meet driver demand torque and to provide the torque transferred by the driveline disconnect clutch to crank the engine. The torque provided by the driveline disconnect clutch to the engine is less than the torque provided to the engine at 432. Method 400 proceeds to 446 after DISG torque is adjusted.

At 446, method 400 adjusts engine torque to accelerate the engine to the DISG speed. Engine torque may be adjusted so that the engine achieves DISG speed via a torque actuator such as a fuel injector and/or a throttle. Engine torque is adjusted since the torque transferred to the engine via the driveline disconnect clutch is insufficient to accelerate the engine to DISG speed. Additionally, driveline disconnect clutch closing force or pressure may be decreased in response to an indication of engine combustion. Method 400 proceeds to 448 after engine torque is adjusted.

At 448, method 400 judges if engine speed is within a threshold speed of DISG speed (e.g., 50 RPM). If so, the answer is yes and method 400 proceeds to 450. Otherwise, the answer is no and method 400 returns to 444.

At 450, driveline disconnect clutch pressure is increased so as to fully close the driveline disconnect clutch. Closing the driveline disconnect clutch allows engine torque to be transmitted to vehicle wheels. Method 400 proceeds to 452 after driveline disconnect clutch pressure starts to increase.

At 452, method 400 adjusts engine torque via a torque actuator to meet the engine demand torque. The engine demand torque may be based on the driver demand torque. In one example, the driver demand torque may be partially or fully demanded of the engine. Further, the driver demand torque may be partially demanded of the DISG. Method 400 proceeds to exit after the driver demand torque is requested via the engine and/or the DISG.

In this way, it is possible to fast start an engine by accelerating the engine to DISG speed or slow start the engine by accelerating the engine to cranking speed. Torque provided to the engine during fast starting is greater than torque supplied to the engine during slow starting. Fast starting the engine may allow engine torque to be transferred to the driveline sooner than if the engine were slow started. Further, various operating conditions may be the basis for judging if the engine should be fast started or slow started.

Thus, the method of FIG. 4 provides for a driveline method, comprising: estimating a driveline integrated starter/generator torque reserve; supplying a first torque to start an engine in response to the driveline integrated starter/generator torque reserve being less than a threshold; and supplying a second torque, different from the first torque, to start the engine in response to the driveline integrated starter/generator torque reserve being greater than a threshold. The method includes where the driveline integrated starter/generator torque reserve is a torque capacity of the driveline integrated starter/generator torque reserve at a present driveline speed minus a present driveline integrated starter/generator torque reserve output torque.

In some examples, the method further comprises reducing the driveline integrated starter/generator torque reserve in response to a steering angle. The method further comprises reducing the driveline integrated starter/generator torque reserve in response to vehicle mass. The method further comprises reducing the driveline integrated starter/generator torque reserve in response to road grade. The method further comprises reducing the driveline integrated starter/generator torque reserve in response to vehicle speed being greater than a non-zero speed threshold. The method further comprises reducing the driveline integrated starter/generator torque reserve in response to an indication of towing a trailer. The method includes where the first torque is sufficient to accelerate the engine to a speed of a driveline integrated starter/generator. The method includes where the second torque is insufficient to accelerate the engine to the speed of the driveline integrated starter/generator.

The method of FIG. 4 also provides for a driveline method, comprising: supplying a first torque to start an engine in response to a first condition of a road; and supplying a second torque, different from the first torque, to start the engine in response to a second condition of the road. The method includes where the first torque is sufficient to accelerate the engine to a speed of a driveline integrated starter/generator. The method includes where the second torque is insufficient to accelerate the engine to the speed of the driveline integrated starter/generator. The method also includes where the condition of the road is a road grade. The method includes where the condition of the road is arrival at an intersection. The method also includes where the intersection is a rail road intersection. The method also includes where the condition of the road is a road roughness amount.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline system, comprising:
an engine;
an electric machine;
a driveline disconnect clutch positioned between the engine and the electric machine; and
a controller including executable instructions stored in non-transitory memory for starting the engine via the electric machine in a first mode where engine cranking torque is sufficient to accelerate the engine to a speed of the electric machine, starting the engine in a second mode where engine cranking torque is insufficient to accelerate the engine to the speed of the electric machine, and adjusting slip of the driveline disconnect clutch to provide engine cranking torque in the first and second modes.

2. The driveline system of claim 1, further comprising additional instructions to estimate a driveline integrated starter/generator torque reserve and enter the first or second mode based on the driveline integrated starter/generator torque reserve.

3. The driveline system of claim 1, further comprising additional instructions to enter the first or second mode based on a condition of a road.

4. The driveline system of claim 3, where the condition of the road is a road grade.

* * * * *